INVENTORS
JOHN B. POWERS
JULE A. RABO

INVENTORS
JOHN B. POWERS
JULE A. RABO
BY William F. Mesinger
ATTORNEY

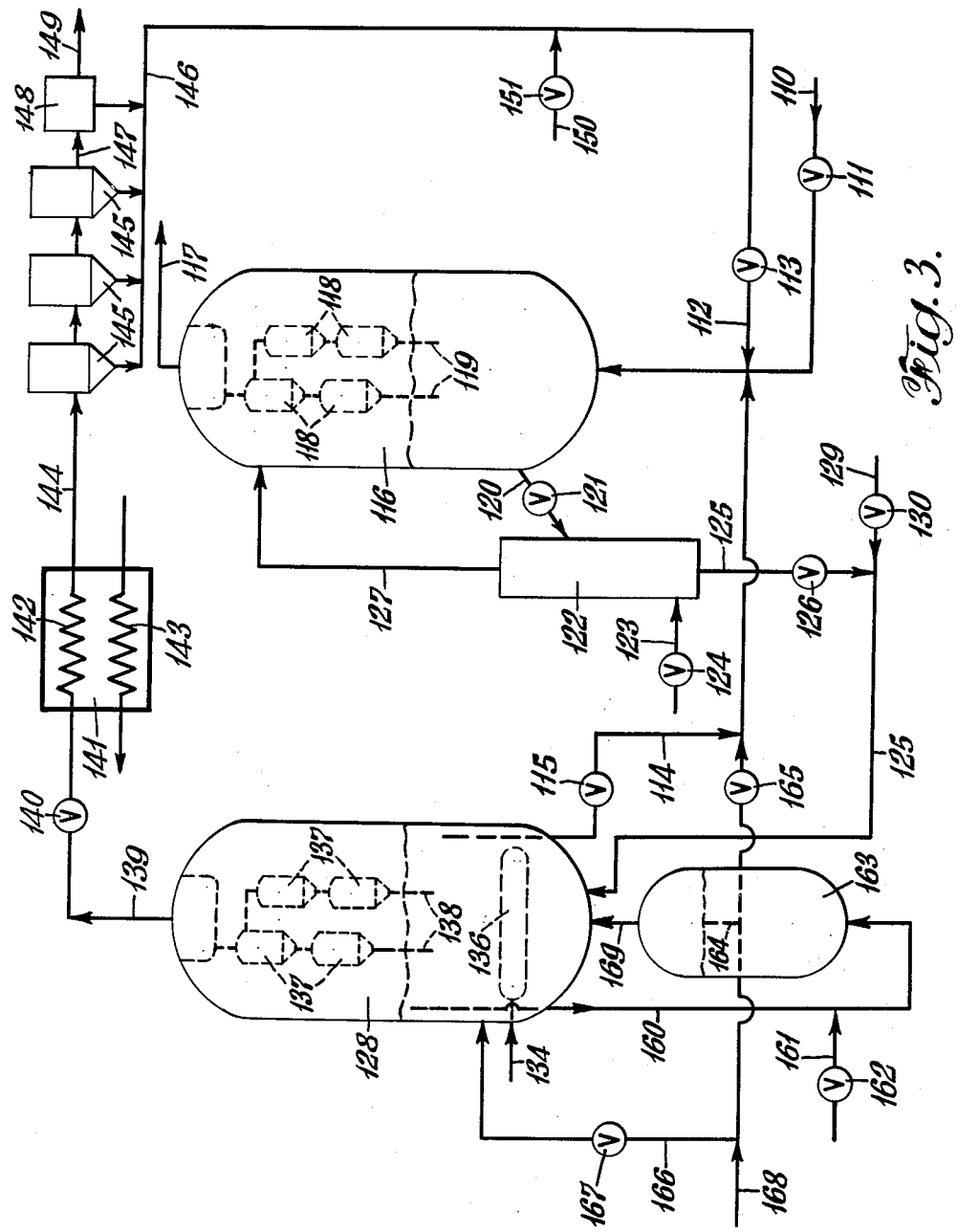

United States Patent Office  
2,985,584  
Patented May 23, 1961

2,985,584

REGENERATION OF COKED CATALYST WITH CONTROLLED OXYGEN CONTENT OF THE REGENERATION GAS

Jule A. Rabo, Buffalo, and John B. Powers, Tonawanda, N.Y., assignors to Union Carbide Corporation, a corporation of New York Filed Nov. 7, 1958, Ser. No. 772,533

15 Claims. (Cl. 208—120)

This invention relates to catalytic cracking of hydrocarbons using finely divided catalyst in a fluidized bed, and more particularly to a catalytic cracking system including improved catalyst regeneration.

In the catalytic conversion of hydrocarbons where finely divided or powdered catalyst is used and more particularly when such catalyst is mixed with a feed of preheated hydrocarbon vapors or vapors and gas mixture prior to passage of the material through a reaction zone where the desired extent of conversion is effected, it is known that carbonaceous matter hereinafter referred to as coke is deposited and coats the catalyst particles. The coke coating reduces the activity of the catalyst, and in the case of catalytically cracking hydrocarbon feeds having boiling points in the range of 400° to 1,000° F., excessive coke buildup on the catalyst particles may adversely affect the hydrocarbon product distribution. That is, in catalytic conversion the hydrocarbon feeds are cracked to more valuable lower boiling hydrocarbons. With fresh catalyst, the hydrocarbon feed is converted to relatively large porportions of the lower boiling fractions, but if the coke coating is allowed to build up indefinitely on the catalyst particles, a relatively poor product distribution with smaller proportions of the lower boiling liquid fractions will result.

The prior art has partially alleviated this problem by regenerating or removing at least part of the coke deposits from the catalyst particles. Regenerated catalyst particles are relatively active and approach the activity of fresh uncoked catalyst particles; the activity and selectivity of regenerated catalyst particles increases as the amount of coke on the catalyst is reduced during regeneration. Completely regenerated catalyst particles having practically no remaining coke deposits thereon are more active for cracking than partially regenerated catalyst particles containing some residual coke material. However, it is also recognized by the prior art that as the amount of coke on the catalyst particles is reduced, it becomes increasingly difficult to remove the remaining coke material. Thus, when there is only a fraction of one percent of coke on the catalyst particles, the regeneration equipment required to remove such remaining coke becomes prohibitively large, complicated and costly. Also, the time for removing the last increment of coke material from the catalyst particles is longer than the time for removing the initially larger amounts of coke, and this phenomenon decreases the overall economic efficiency of the catalytic cracking process.

In a widely used catalytic converting and regenerating process, mixtures of preheated hydrocarbon vapors and catalyst particles are passed through a reaction zone for conversion of the hydrocarbons, and the velocity of the vapors and gases leaving the top of the reaction zone is so maintained that the catalyst particles are fluidized and assume a level similar to a liquid, hence the description "fluidized bed." The coke-coated catalyst particles, having a greater density than fresh catalyst, are concentrated in the lower portion of the bed and are continuously passed preferably by means of a carrier gas stream to a regenerative zone where at least most of the coke is burned off by contact with air. The partially regenerated catalyst particles are then recycled to the reaction zone for reuse in the previously described manner.

This process has several important limitations in addition to the previously discussed difficulty and great expense in removing the last portion of the deposited coke. For example, air contains approximately 21% oxygen, 78% nitrogen, and 1% inerts so that the bulk of the regenerating gas in fact serves no useful purpose since it merely passes through the regenerative zone without reacting with the coke. The non-oxygen components of the inlet air are thus discharged as part of the top effluent from the regenerative zone. Since the regenerator is designed to withstand certain temperatures and pressures, the use of air as the oxidizing gas also means that a substantial portion of the regenerator cost must be attributed to the pressure and velocity created by the relatively inert nitrogen gas. Another significant disadvantage is that the relatively high regenerator gas velocities necessitated by the nitrogen component cause slugging of catalyst particles, hence attrition and catalyst loss as well as non-uniformity of particles and resultant poor regenerator control. It will also be evident that using air as the coke oxidizing agent requires a relatively high volume of regenerator kiln capacity per pound of coke burned.

A principal object of the present invention is to provide an improved process of and apparatus for the catalytic conversion of hydrocarbons.

A further object is to provide an improved process of and apparatus for regenerating the coke-coated catalyst particles removed from the reaction zone of a hydrocarbon catalytic cracking process.

Still further objects are to provide an improved regenerating process and apparatus in which the regenerator operating pressure and gas throughput velocity may be reduced for a given rate of coke removal, catalyst attrition losses are reduced, regenerator control is improved, and in which the required volume of regenerator kiln capacity per pound of coke burned is reduced.

Another object of the present invention is to provide an improved process of and apparatus for catalytic conversion of hydrocarbons in which the last fractions of a percent of coke material may be efficiently and economically removed from the partially regenerated catalyst particles.

Other objects and advantages of the present invention will be apparent from the following descriptions and drawings in which:

Fig. 3 is a schematic flow diagram of a catalytic hydrocarbon converting system, according to another embodiment of the invention.

In the drawings similar items of apparatus in the several figures are designated by similar reference characters.

Figure 1:
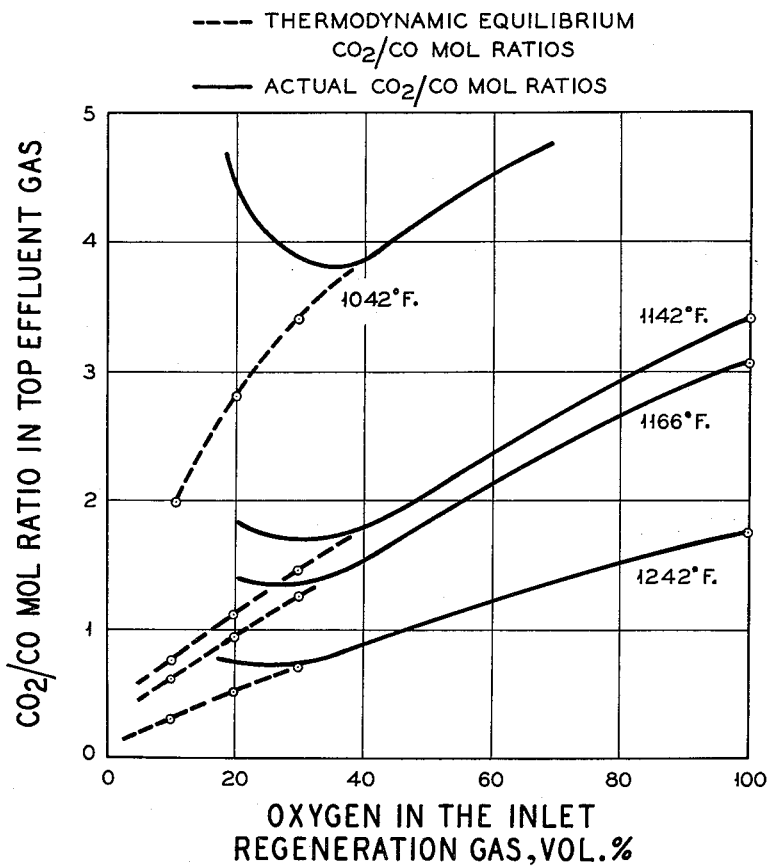
Fig. 1 is a graph showing the effect of oxygen concentration in the inlet regeneration gas on the carbon dioxide to carbon monoxide molar ratio in the top effluent gas from a regenerator.

In the regeneration of coked catalyst particles in catalytic cracking processes, the following main chemical reactions occur:

(1) $C + O_2 \rightleftharpoons CO_2$
(2) $CO_2 + C \rightleftharpoons 2CO$
(3) $2CO + O_2 \rightleftharpoons 2CO_2$ The first and third reactions are oxidations and the second is reduction and oxidation. Exothermic reactions are favored by lower temperatures and endothermic reactions by elevated temperatures, so that high temperatures favor Reaction 2 over Reactions 1 and 3. The first and second reactions are the actual coke burnoff reactions, while the third reaction only consumes oxygen and being strongly exothermic, increases the heat release in the regenerator. Reaction 3 should therefore be suppressed. Burnoff of the coke deposit by the introduction of oxygen containing gas begins according to Reaction 1 and after $CO_2$ is produced, the consumption of coke according to Reaction 2 can be initiated. The third reaction takes place only if excess oxygen is present in the reaction zone in which most of the CO is produced. In this case, the entire amount of CO produced in Reaction 2 can be transformed to $CO_2$, and the only reaction product of the burnoff is $CO_2$.

The influenecing factors for the above-mentioned reactions are the thermodynamic equilibria at the reaction conditions and the correlation between the three reaction rates. The equilibrium conversion and rate of the reactions are dependent on the thermodynamic properties, reaction conditions and the concentrations of the reactants. The complex nature of these reactions can be analyzed by considering that the $CO_2$ for Reaction 2 will be produced by Reaction 1, and that the CO for Reaction 3 will be produced by Reaction 2.

In catalyst regeneration it is desirable to provide conditions favorable to high concentrations of CO instead of $CO_2$ in the reaction product, since the former utilizes the available oxygen more efficiently than the latter in requiring only half as much oxygen to burn a given quantity of coke. In burning coke to CO, less heat is liberated than in burning to $CO_2$, thereby enabling more coke to be burned for a given heat dissipation capacity which often times is limiting in regenerator operation. Thus, the oxygen in Reactions 1 and 3 should be suppressed and enough carbon for Reaction 2 should be provided, the latter being the slower reaction of the regeneration process. In practice, this means that the oxygen content of the regenerating gas should be primarily consumed in a first part of the regenerative zone directly above the regeneration gas inlet, so as to produce $CO_2$ by Reaction 1. For the same reason, surplus carbon should be present in a second part of the regenerative zone, between the top of the first zone and the top of the fluidized bed. This will provide favorable conditions for the production of the CO by Reaction 2, and the low oxygen concentration will prevent the oxidation of CO to $CO_2$ by Reaction 3.

In order to favor Reaction 2, the effect of reaction rates must also be considered. Reaction 1 at conventional regeneration temperatures, e.g. 1,100° F., is a rapid reaction even without any catalytic effect. Reaction 3 is slow below about 1,200° F. in the absence of catalytic activators, and a buildup of CO concentration can be attained even in the presence of oxygen.

The present invention is based on the discovery that the coke burnoff efficiency can be remarkably improved by regenerating spent catalyst particles with gas containing between about 22% and 35% by volume oxygen available for combustion. Referring now to Fig. 1, this graph shows the effect of oxygen concentration in the inlet regeneration gas on the $CO_2/CO$ molar ratio in the top effluent gas from a regenerator, for several operating temperatures. As previously stated, Reaction 2 determines the efficiency of oxygen utilization in the catalyst regeneration process. The rate of this reaction at a given temperature is slower than Reaction 1. Therefore, at a low initial oxygen concentration such as 21% and below, the CO concentration is less than the equilibrium value and the $CO_2/CO$ molar ratio is higher than the thermodynamic equilibrium value. The deviation from CO equilibrium value is more pronounced at low temperatures, i.e., below 1,100° F., and in the range of oxygen concentrations up to about 30%, the $CO_2/CO$ ratio decreases with increasing oxygen content in the inlet gas. As the oxygen content of the inlet gas is increased further, the $CO_2/CO$ ratio reaches the equilibrium value for Reaction 2. After this point, the $CO_2/CO$ ratio will continuously increase as determined by the equilibrium value (see Fig. 1). It thus appears that there is an optimum oxygen concentration for each regeneration temperature which provides a minimum $CO_2/CO$ ratio, and this concentration also corresponds to maximum oxygen utilization efficiency. Also, a close examination of the curves indicates that the $CO_2/CO$ ratio is not appreciably greater up to about 35% oxygen than at about 22% oxygen since it passes through a minimum therebetween. Therefore, the broad range of oxygen concentrations in the regenerator inlet gas according to the present invention is about 22% to 35%, and the preferred range is between about 23% and 30% oxygen by volume. Above about 35% oxygen, the $CO_2/CO$ ratio increases to such an extent that further oxygen enrichment leads to an oxygen utilization which is poorer than that of air. The curves of Fig. 1 were derived from thermodynamic treatment of actual operating data. It should be recognized, however, that the overall rate and extent of coke conversion can be strongly influenced by the regeneration temperature and pressure.

Fig. 1 also shows that by increasing the regenerator operating temperature, the $CO_2/CO$ ratio drops considerably. Thus, the only temperature limitations of the present process are those imposed by the catalyst material and are not inherent in the effectiveness of oxygen enrichment of the regenerator inlet gas. For example silica-alumina cracking catalysts, either synthetic or natural, are preferred in practicing the invention and such material is usually regenerated in a broad temperature range of 1,000° to 1,400° F. although a narrower range of 1,100° to 1,200° F. is preferred. The lower end of the temperature range must be sufficiently high to obtain a reasonable regeneration rate, and the upper end of the temperature range is limited by the catalyst stability or loss of catalyst activity.

Consideration of the effects of pressure on the thermodynamic equilibrium of Reaction 2 shows that the $CO_2/CO$ ratio increases with increasing pressure, so that for efficient oxygen utilization (i.e., a low $CO_2/CO$ ratio) it is desirable to operate the regenerator at low pressure in the range of less than about 25 p.s.i.g., and preferably about 8 to 12 p.s.i.g. High oxygen partial pressures which have been found desirable for high burning rates and increased catalyst throughput can be achieved at low total pressure only through oxygen enrichment of the regenerator feed gas according to the present invention. Stated in another way, a portion of the inert nitrogen molecules in air are replaced by oxygen molecules so that the total amount of regeneration gas is less and consequently the total pressure in the system at the same oxygen throughput is lower. This results in a decrease in the $CO_2/CO$ ratio and thus an overall increase in the oxygen utilization efficiency is achieved.

Since in the practice of this invention, the upper limit of the preferred oxygen concentration range is about 30% by volume and the regenerator pressure is below about 25 p.s.i.g., the oxygen partial pressure must be less than about 0.3 (14.7+25)=11.9 p.s.i.

According to another aspect of the invention, an improved process for removing substantially all of the coke coating from the spent catalyst particles is provided in which partially regenerated catalyst particles are removed from the regenerative zone, mixed with a second stream of oxygen-rich gas, and passed through an auxiliary regenerative zone where the particles are further regenerated by burning with the second stream. The further regenerated catalyst particles are recycled to the reaction zone and the carbon oxides-containing partially reduced second gas stream is directed along with at least a third oxygen-containing gas stream to the regenerative zone as the first regenerator inlet gas stream containing between about 22% and 35% by volume oxygen equivalent. Since coke is converted to CO by reaction with $CO_2$ according to Reaction 2, one-half of the oxygen contained in the $CO_2$ effluent from the auxiliary regenerative zone in addition to the free oxygen in this effluent stream is considered to have equivalent oxidation potential for mixing with the third oxygen-containing gas stream.

As previously discussed, if the oxygen in the first or main regenerator inlet air is increased to something less than about 35% by volume oxygen content, the rate of burnoff will be increased in the first part of the regenerative zone directly above the gas inlet, due to the high coke and oxygen content. Since the oxygen content will decrease along with the coke content, at subsequent parts of the regenerative zone where the coke content is lower, the effect of the increased initial oxygen content on the final coke content will be minor. The overall rate effect can be improved if a gas having a high oxygen content is used for the burnoff before dilution with the main regenerator air, but provisions must be made to offset the undesirable effects of high oxygen concentration on the $CO_2/CO$ equilibrium. The present invention effectively achieves this condition by introducing a second stream of oxygen-rich gas, preferably at least about 80% pure, in the auxiliary regenerator for reaction with partially regenerated catalyst from the main regenerative zone preferably containing between about 0.2 and 0.7% by weight coke. Most of the oxygen in the second stream is converted to $CO_2$ in the auxiliary regenerative zone and any residual oxygen plus the $CO_2$ can then be introduced into the main regeneration system. In this manner, the coke content of the catalyst can be reduced at very short contact time to unusually small values such as 0.01 weight percent. The resulting partially reduced second gas stream containing $CO_2$ and oxygen may then be used to enrich the main regenerator air and further increase the rate of burnoff therein.

Figure 2:
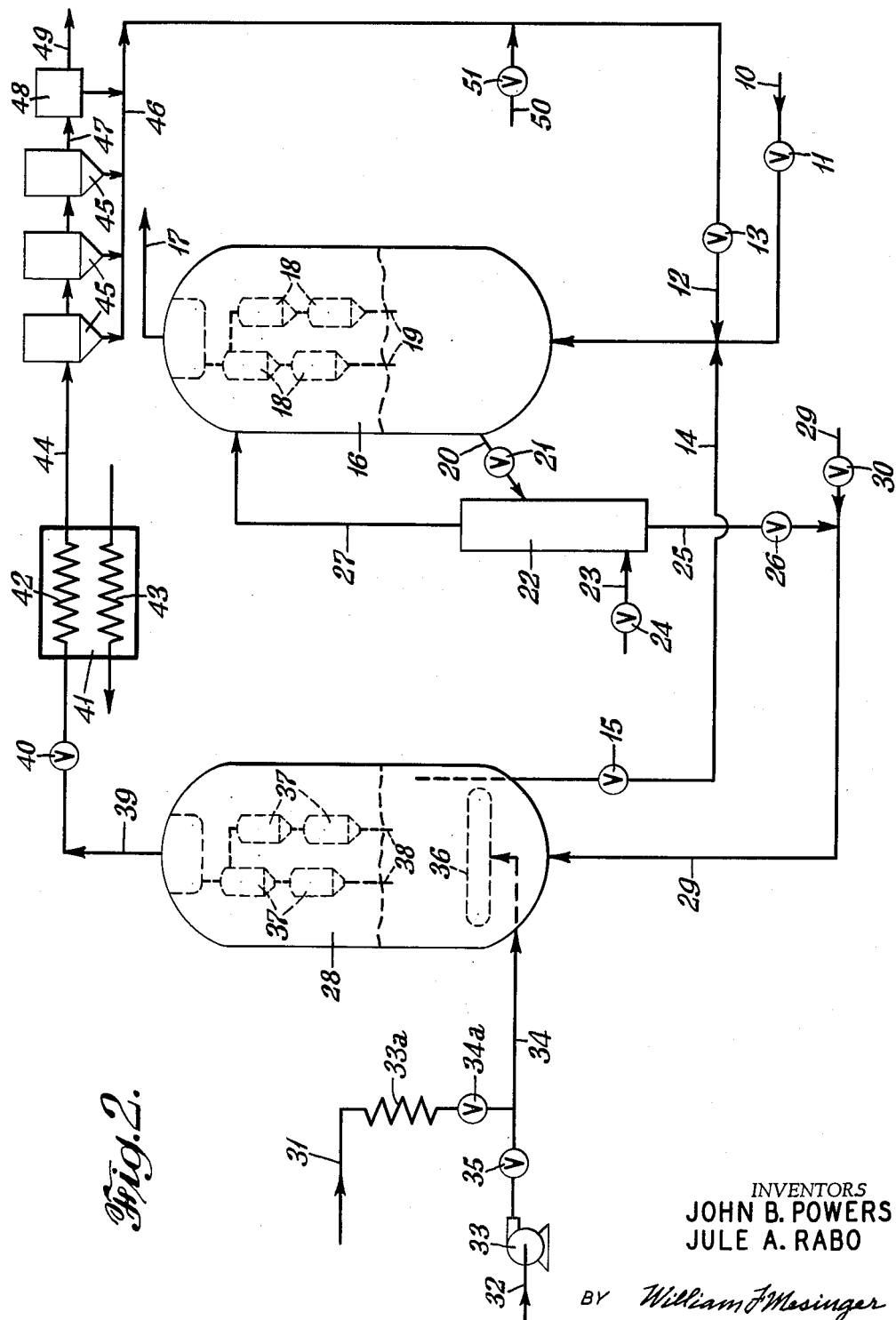
Fig. 2 is a schematic flow diagram of an exemplary system for catalytically converting a feed stream of hydrocarbon vapors and gases, according to the present invention.

Referring now to Fig. 2, preheated hydrocarbon gas and vapors are introduced into the system through conduit 10 and valve 11, the hydrocarbons preferably having boiling points between about 400° and 1,000° F. Entrained regenerated and new catalyst particles are introduced into conduit 10 through branch conduit 12 and control valve 13 therein, and recycled regenerated catalyst particles are also introduced into conduit 10 through branch conduit 14 and control valve 15 therein. The regenerated finely divided or powdered catalyst particles preferably contain between about 0.2 and 0.7% by weight coke and may be recycled at between 1,000° and 1,400° F. The catalyst particles fed into conduit 10 are mixed with the hydrocarbon feed stream therein to form a suspension therein, and if desired a suitable gas may be introduced into the mixing zone to aid in dispersing the solid catalyst particles. As previously discussed, natural or synthetic silica-alumina particles containing between about 12 and 25% by weight alumina are preferred as the catalyst material. To obtain the desired fluidized bed, the catalyst preferably has an average particle size of about 40 to 60 microns. Other catalysts such as magnesium silicate, kaolins and clays would also be suitable.

The catalyst particles and hydrocarbon feed may be mixed in catalyst/feed weight ratio of about 3:1 to 15:1 to obtain the fluidized state, and a ratio of about 5:1 to 6:1 is preferred. The mixture is passed through conduit 10 into the lower portion of an enlarged vertically disposed reaction zone or vessel 16 operating at a pressure less than about 25 p.s.i.g. and preferably about 8 to 12 p.s.i.g. Due to the enlarged diameter of the reactor 16 the velocity of the vapor and gases is decreased as they enter and pass upward through the vessel, and the catalyst is substantially disengaged from the vapor stream in the upper portion of such reaction vessel. However, the velocity of the mixture through the reactor is high enough to provide fluidization of catalyst particles in the base of the vessel 16. The catalyst particles and hydrocarbon vapors and gases are in a turbulent condition in the reaction vessel and due to the intimate mixing, intimate contact is maintained between the catalyst particles and the hydrocarbons. Also, a substantially uniform temperature in the range of about 850° to 1,000° F. is maintained in the mixture in reactor 16 to effect the desired extent of conversion. During the conversion the catalyst particles become coated with coke to an accumulation limit preferably between about 2% and 3% coke and their activity is reduced. It should be understood, however, that the coke concentration may be allowed to rise above this preferred range although the efficiency of the overall process will be reduced thereby. Also, the deposited coke is in turn coated with hydrocarbons so that the total catalyst coating comprises about 88% by weight carbon and 12% hydrogen.

The products of conversion and spent catalyst particles pass upwardly for at least partial separation in a plurality of cyclone-type separators 18 near the top of the reactor 16. The separated spent catalyst is returned to the fluidized bed through conduits 19 and the product gas usually still containing a small quantity of spent catalyst, is discharged through conduit 17 for further processing. The spent catalyst is withdrawn from the bottom of reactor 16 into conduit 20 and passed through control valve 21 therein into stripper 22 preferably operating at a pressure of about 8 to 12 p.s.i.g. The purpose of stripper 22 is to remove as much as possible of the hydrocarbon material from the coke-coated spent catalyst and a stripping fluid such as steam or another hot gas is introduced into the stripper base through conduit 23 and control valve 24 therein for countercurrent flow against and in intimate contact with the descending spent catalyst particles. It is advantageous to strip as much of the hydrocarbon material as possible from the spent catalyst because any remaining hydrocarbons must be subsequently burned off in the regenerative zone. Hydrocarbon burnoff in the regenerator has at least two important disadvantages; namely, such hydrocarbon materials are lost from the system in the regenerator top effluent gas, and a relatively high quantity of oxygen is required to burn off hydrocarbons as compared to coke burnoff. Local overheating and rapid temperature rise in the catalyst bed can also result from the burning of excess amounts of adsorbed hydrocarbons. Accordingly, the stripped spent catalyst discharged from the bottom of stripper 22 through conduit 25 and control valve 26 therein has a coke coating containing only about 8% by weight hydrogen which is adsorbed and physically held in the catalyst structure so as to be substantially non-vaporizable. The hydrocarbon-containing stripping fluid is discharged from the top of stripper 22 through conduit 27 and recycled to reactor 16.

The stripped spent catalyst in conduit 25 is transported to the base of regenerator 28 by means of a carrier gas stream which for example may be air diluted with flue gas or steam introduced through conduit 29 and control valve 30 therein, and the mixture enters the base section of regenerator 28 which is preferably operated at a pressure up to about 25 p.s.i.g. and most suitably at about 8 to 12 p.s.i.g. At least part of the oxygen-containing regenerator feed gas stream is preferably formed by introducing a pressurized oxygen-rich stream in conduit 31, either as a liquid or a gas, and providing an air stream in conduit 32 which is transmitted therethrough by pump 33. If the pressurized oxygen stream is supplied as liquid, vaporizer 33a is provided in conduit 31. The two streams are mixed in connecting conduit 34, and controllably blended by means of valve 34a in oxygen conduit 31 and valve 35 in air conduit 32. The last-mentioned gas stream is introduced in the base of regenerator 28 through distributor ring 36 and mixes with the spent catalyst carrier gas stream so as to provide a regenerator inlet gas stream containing between about 22% and 35% by volume oxygen, and preferably between about 23% and 30% by volume oxygen. It is to be understood that if the carrier gas stream contains oxygen, such oxygen provides part of the oxygen equivalent content of the regenerator inlet gas. The latter gas mixes with the stripped spent catalyst particles, the mixture passing upwardly through the regenerator in a turbulent state so that intimate contact therebetween is obtained. Due to the mixing and movement of the catalyst particles and gases, the temperature during regeneration is maintained substantially uniform, in a range of about 1,000° to 1,400° F., preferably between 1,100° and 1,200° F., and there is no overheating of the catalyst particles which are maintained in a fluidized state during regeneration. At least most of the coke coating is burned off of the catalyst particles during regeneration, and the regenerated catalyst preferably containing between about 0.2 and 0.7% coke is discharged through conduit 14 and control valve 15 for recycling back to reactor 16 in the previously described manner. The carbon oxides-containing reduced gas emerging from the regenerator catalyst fluidized bed rises into the upper section of regenerator 28 and passes through a plurality of cyclone-type separators 37 which remove at least part of the regenerated catalyst entrained in the gas, the latter returning to the fluidized bed through conduits 38. The top effluent gas is discharged from the regenerator 28 through conduit 39 and control valve 40 therein, conducted through heat exchanger 41 and passageway 42 therein in thermal association with a process stream, e.g. steam, in passageway 43 so as to heat the latter and recover sensible heat from the regenerator top effluent.

The regenerated catalyst particles still remaining in the cooled top effluent gas discharged from heat exchanger 41 into conduit 44 are recovered in a separation system comprising a bank of cyclone-type separators 45 arranged in a series flow relationship. The relatively coarse regenerated catalyst particles recovered from these separators are collected in conduit 46, and the regenerators top effluent gas is discharged from separator bank 45 into conduit 47 for passage through electrostatic precipitator 48 for removal of catalyst fines as a last stage of separation. The catalyst-scavenged and cooled regenerator effluent gas is discharged from precipitator 48 into conduit 49 for discharge to the atmosphere or further processing as desired, and the catalyst fines are passed into collection passageway 46 for recycling to the reactor 16 through conduit 12 and control valve 13 therein. Fresh, unused catalyst particles may be introduced into conduit 12 through branch conduit 50 and control valve 51 therein.

Fig. 3 illustrates another embodiment of the invention providing for removal of substantially all of the coke deposited on the catalyst particles thereby permitting return of substantially completely reactivated catalyst to the reactor. This system is similar to that illustrated in Fig. 2 except that it differs in certain details which will now be described in detail. Partially regenerated catalyst particles containing preferably between about 0.2 and 0.7% by weight coke are removed from main regenerator 128 through conduit 160 for example by gravity drain. A second oxygen-rich gas stream preferably having at leat 80% by volume oxygen is introduced into conduit 160 through conduit 161 and control valve 162 therein for mixing with the removed partially regenerated catalyst particles. The mixture is passed into auxiliary regenerator 163 where the catalyst assumes a fluidized state and additional coke is burned off the catalyst particles with the concentrated oxygen stream. Further regenerated catalyst particles containing less than about 0.2% by weight coke and preferably less than about 0.1% coke are removed from auxiliary regenerator 163 through conduit 164 and control valve 165 therein. Conduit 164 connects with catalyst recycle conduit 114 so that the further regenerated catalyst particles are returned therethrough to conduit 110 and directed to reactor 116 for reuse. Partially regenerated catalyst particles may be simultaneously recycled to reactor 116 from main regenerator 128 through conduit 114 and control valve 115 if desired. The degree of catalyst regeneration achieved in the main regenerator 128 and the auxiliary regenerator 163, and the ratio in which the catalyst material from these respective regenerators are mixed to form the catalyst feed to reactor 116 is controlled to produce the catalyst selectivity and activity to achieve the desired operating conditions in reatcor 116.

The further regenerated catalyst particles leaving auxiliary regenerator 163 contain an appreciable amount of oxidizing gas which would have a detrimental effect if returned to reactor 116. One reason for this situation is that such oxidizing gas would cause excessive temperature buildup in the reactor and deposition of additional coke on the catalyst particles. Accordingly, it is desirable to pass relatively inert gas to reactor 116 with the regenerated catalyst particles, and one efficient and preferred method of accomplishing this objective is to divert the further regenerated catalyst-oxidizing gas stream from conduit 164 through conduit 166 and control valve 167 therein to main regenerator 128 for mixing with regenerated catalyst material therein. A catalyst carrier gas stream may be introduced into conduit 166 through conduit 168 if desired. The oxidizing gas introduced in main regenerator 128 through conduit 166 aids in combustion of the coke therein, and is thus dissipated so that only substantially inert gas is recycled through conduit 114 to reactor 116 along with the mixture of regenerated and further regenerated catalyst material.

The oxygen-containing second gas stream is preferably introduced into conduit 160 in sufficient quantities so that the gas is only partially combusted to $CO_2$ in auxiliary regenerator 163, and the exit gas vented from the top of such regenerator through conduit 169 contains unreacted free oxygen. Conduit 169 communicates at its opposite end with the base of main regenerator 128 so that the remaining oxygen and one-half of the oxygen content of the $CO_2$ in the partially combusted second gas stream serves to enrich the main regenerator air introduced into the regenerator base through conduit 134. The two gas streams along with any oxygen introduced in the spent catalyst carrier gas stream in conduit 125 are mixed in relative quantities so as to form a combined regenerator inlet gas stream having between about 22% and 35% oxygen equivalent by volume. It can thus be seen that increased coke burnoff rates and capacity in the main regenerator can be maintained even though such regenerator is combined with an auxiliary regenerator for further removal of coke prior to catalyst recycling. The advantages of the auxiliary regenerator embodiment of the present invention are illustrated in the following table:

*Effect of oxygen enrichment on the time of regeneration in fluid bed systems*

| | | | | | |
|---|---|---|---|---|---|
| Initial coke content of the catalyst, wt.-percent | 2.0 | 2.0 | 2.0 | 2.0 | 0.5 |
| Coke content of the regenerated catalyst, wt.-percent | 0.5 | 0.1 | 0.5 | 0.1 | 0.1 |
| Total pressure, atm | 1.0 | 1.0 | 1.0 | 1.0 | 1.0 |
| Inlet gas oxygen content, vol.-percent | 20 | 20 | 30 | 30 | 100 |
| Oxygen partial pressure in the inlet gas, atm | 0.2 | 0.2 | 0.3 | 0.3 | 1.0 |
| Top effluent gas oxygen content, vol.-percent | 1.0 | 1.0 | 1.0 | 1.0 | 40 |
| Oxygen partial pressure in the top effluent gas, atm | 0.01 | 0.01 | 0.01 | 0.01 | 0.4 |
| Temperature, °F | 1,100 | 1,100 | 1,100 | 1,100 | 1,100 |
| Average burning rate, gms. coke/100 gms. catalyst/sec | $2.10 \times 10^{-3}$ | $2.38 \times 10^{-4}$ | $2.64 \times 10^{-3}$ | $2.70 \times 10^{-4}$ | $1.58 \times 10^{-3}$ |
| Time of regeneration, sec | 715 | 7,999 | 567 | 7,045 | 252 |

Column 1 presents data representing conventional regenerator operation, showing that it requires about 715 seconds to regenerate the catalyst from a coke level of 2% to 0.5%. The data of column 2 show that regeneration with air to a relatively low coke level of 0.1% takes over ten times as long as the conventional regeneration to 0.5% which presents serious economic disadvantages in regenerator design and operation. Columns 3 and 5 demonstrate the single and combined effect of oxygen enrichment to 30% in the main regenerator to reduce the coke level from 2% to 0.5% and the use of pure oxygen in the auxiliary regenerator to further reduce the coke concentration from 0.5% to 0.1%. Using oxygen enrichment according to the present invention permits a nine-fold reduction in regeneration time over that attainable with air. This means that either the catalyst throughput rate may be appreciably increased or a higher degree of coke removal may be realized for the same throughput rate, both of which permit improved hydrocarbon product distribution.

Although preferred embodiments of the invention have been described in detail, it is contemplated that modifications of the process and apparatus may be made and that some features may be employed without others, all within the spirit and scope of the invention.

What is claimed is:

1. In a process of converting hydrocarbons in the presence of finely divided silica-alumina catalyst wherein preheated hydrocarbon vapors and gases are mixed with finely divided catalyst particles and the mixture is passed through a reaction zone to effect the desired conversion during which the catalyst particles become coated with volatile hydrocarbons and coke after which the coated catalyst particles are removed from the reaction zone for separation from the conversion products and regenerated in a regeneration zone by burning with oxygen-containing gas which is converted thereby to carbon oxides-containing reduced gas and vented as top effluent gas, the regenerated catalyst particles being recycled to said reaction zone for reuse therein, the improvement comprising the step of effecting such regeneration in said regeneration zone by contact with a gas stream containing between about 23% and 30% by volume oxygen equivalent at a temperature between about 1,000° and 1,400° F. and a pressure below about 25 p.s.i.g., thereby providing an oxygen partial pressure of less than about 11.9 p.s.i.

2. A process according to claim 1 for converting hydrocarbons in the presence of finely divided silica-alumina catalyst, in which said gas stream is air enriched with sufficient oxygen for the carbon dioxide to carbon monoxide molar ratio in said top effluent gas vented from the regenerative zone to be a minimum, thereby maximizing oxygen utilization efficiency.

3. A process according to claim 1 for converting hydrocarbons in the presence of finely divided silica-alumina catalyst, in which the oxygen-containing gas stream is air in which a portion of the nitrogen molecules have been replaced by oxygen molecules so that the carbon dioxide to carbon monoxide molar ratio in said top effluent gas vented from the regenerative zone is reduced and the oxygen utilization efficiency is increased.

4. A process for converting hydrocarbons into products in the presence of finely divided silica-alumina catalyst including the steps of providing a pressurized preheated hydrocarbon vapor and gas feed stream; mixing such feed stream with finely divided catalyst particles and passing the mixture through a reaction zone to effect the desired conversion during which the catalyst particles become coated with volatile hydrocarbons and coke; removing the coated catalyst particles from the reaction zone for separation from the conversion products providing a stripping fluid and contacting said coated catalyst particles with such fluid so as to remove said volatile hydrocarbons from the catalyst particles; transferring such coke coated particles to a regenerative zone; introducing a gas stream containing between about 23% and 30% by volume oxygen equivalent in said regenerative zone; mixing such oxygen-containing stream with the coated catalyst particles and burning off at least most of the coke coating therefrom at a temperature between about 1,000° and 1,400° F. and a pressure below about 25 p.s.i.g., thereby providing an oxygen partial pressure of less than about 11.9 p.s.i.; venting the resulting carbon oxides-containing reduced gas stream from the regeneration zone as top effluent; and recycling the regenerated catalyst particles to said reaction zone.

5. A process for catalytically converting hydrocarbons having boiling points between about 400° F. and 1,000° F. into products in the presence of finely divided silica-alumina catalyst including the steps of providing a pressurized preheated hydrocarbon vapor and gas feed stream; mixing such feed stream with finely divided catalyst particles and passing the mixture through a reaction zone to effect the desired conversion during which the catalyst particles become coated with volatile hydrocarbons and coke; removing the coated catalyst particles from the reaction zone for separation from the conversion products and providing a stripping fluid and contacting said coated catalyst particles with such fluid so as to remove said volatile hydrocarbons from the catalyst particles; transferring such particles to a regenerative zone; introducing a gas stream containing between about 23% and 30% by volume oxygen equivalent in said regenerative zone; mixing such oxygen-containing stream with the coated catalyst particles and burning off at least most of the coke coating therefrom at a temperature between about 1,000° and 1,400° F. and a pressure below about 25 p.s.i.g., thereby providing an oxygen partial pressure of less than about 11.9 p.s.i.; venting the resulting carbon oxides-containing reduced gas stream from the regeneration zone as top effluent; and recycling the regenerated catalyst particles to said reaction zone.

6. A process for catalytically converting hydrocarbons having boiling points between about 400° F. and 1,000° F. into products in the presence of finely divided silica-alumina catalyst including the steps of providing a pressurized preheated hydrocarbon vapor and gas feed stream; mixing such feed stream with finely divided catalyst particles and passing the mixture through a reaction zone to effect the desired conversion during which the catalyst particles become coated with volatile hydrocarbons and between about 2% and 3% by weight coke; removing the coated catalyst particles from the reaction zone for separation from the conversion products; providing a stripping fluid and contacting said coated catalyst particles with such fluid so as to remove said volatile hydrocarbons from the catalyst particles; transferring such particles to a regenerative zone operating at a temperature about 1,000° F. and 1,400° F. and a pressure below about 25 p.s.i.g.; introducing a gas stream containing between about 23% and 30% by volume oxygen equivalent in said regenerative zone thereby providing an oxygen partial pressure of less than about 11.9 p.s.i.; mixing such oxygen-containing stream with the coated catalyst particles and burning off at least most of the coke coating therefrom so that the regenerated catalyst particles have a residual coke concentration of between about 0.2 and 0.7% by weight; venting the resulting carbon oxides-containing reduced gas stream from the regeneration zone as top effluent; and recycling the regenerated catalyst particles to said reaction zone.

7. In a process of converting hydrocarbons in the presence of finely divided catalyst wherein preheated hydrocarbon vapors and gases are mixed with finely divided catalyst particles and the mixture is passed through a reaction zone to effect the desired conversion during which the catalyst particles become coated with coke after which the coated catalyst particles are separated from the conversion products and partially regenerated by burning with oxygen-containing gas which is converted thereby to carbon oxides-containing reduced gas and vented as top effluent gas, the improvement comprising the steps of effecting such partial regeneration in a zone by contact with a gas stream containing between about 22% and 35% by volume oxygen equivalent; removing partially regenerated particles from the regenerative zone; mixing such particles with a second stream of oxygen-rich gas; passing the resulting mixture through an auxiliary regenerative zone and further regenerating the partially regenerated catalyst particles therein by burning with the second oxygen-rich gas stream which is partially reduced thereby, the further regenerated catalyst particles being recycled to said reaction zone; and directing the carbon oxides-containing partially reduced second gas stream along with at least a third oxygen-containing gas stream to said regenerative zone as said gas stream containing between about 22% and 35% by volume oxygen equivalent.

8. A process according to claim 7 for converting hydrocarbons in the presence of finely divided catalyst, in which a gas stream containing at least about 80% oxygen constitutes said second stream of oxygen-rich gas.

9. A process according to claim 7 for converting hydrocarbons in the presence of finely divided catalyst, in which air constitutes said third oxygen-containing gas stream.

10. A process according to claim 7 for converting hydrocarbons in the presence of finely divided catalyst, in which the catalyst particles discharged from said reaction zone contain between about 2 and 3% by weight coke, and the further regenerated catalyst particles recycled from said auxiliary regenerative zone to such reaction zone contain less than about 0.2% by weight coke.

11. A process according to claim 7 for converting hydrocarbons in the presence of finely divided catalyst, in which the catalyst particles discharged from said reaction zone contain between about 2 and 3% by weight coke, the partially regenerated catalyst particles removed from the regenerative zone contain between about 0.2 and 0.7% by weight coke, and the further regenerated catalyst particles recycled from said auxiliary regenerative zone to such reaction zone contain less than about 0.2% by weight coke.

12. A process for catalytically converting hydrocarbons into products in the presence of finely divided catalyst including the steps of providing a pressurized preheated hydrocarbon vapor and gas feed stream; mixing such feed stream with finely divided catalyst particles and passing the mixture through a reaction zone to effect the desired conversion during which the catalyst particles become coated with coke; separating the coated catalyst particles from the conversion products and transferring such particles to a first regenerative zone; introducing a first gas stream containing between about 22% and 35% by volume oxygen equivalent in said first regenerative zone; mixing said first gas stream with the coated catalyst particles and burning off the bulk of the coke coating therefrom; venting the resulting carbon oxides-containing reduced gas stream from said first regenerative zone as top effluent; removing partially regenerated catalyst particles from the first regenerative zone and mixing such particles with a second oxygen-rich gas stream; passing the mixture through an auxiliary regenerative zone and further regenerating the removed catalyst particles by burning with the second gas stream which is partially reduced thereby; recycling the further regenerated catalyst particles to said reaction zone; and directing the resulting carbon oxides-containing partially reduced second gas stream from the auxiliary regenerator along with at least a third oxygen-containing gas stream to said first regenerative zone as said first gas stream.

13. A process for catalytically converting hydrocarbons having boiling points between about 400° F. and 1,000°F. into products in the presence of finely divided silica-alumina catalyst including the steps of providing a pressurized preheated hydrocarbon vapor and gas feed stream; mixing such feed stream with finely divided catalyst particles and passing the mixture through a reaction zone to effect the desired conversion during which the catalyst particles become coated with between about 2 and 3% by weight coke; separating the coated catalyst particles from the conversion products and transferring such particles to a first regenerative zone operating at a temperature between about 1,000° F. and 1,400°F. and a pressure below about 25 p.s.i.g.; introducing a first gas stream containing between about 22% and 35% by volume oxygen equivalent in said first regenerative zone; mixing said first gas stream with the coated catalyst particles and burning off the bulk of the coke coating therefrom so that the catalyst particles are partially regenerated and contain between about 0.2 and 0.7% by weight coke; venting the resulting carbon oxides-containing reduced first gas stream from said first regenerative zone as top effluent; removing the partially regenerated catalyst particles from the first regenerative zone and mixing such particles with a second gas stream containing at least about 80% oxygen; passing the mixture through an auxiliary regenerative zone and further regenerating the removed catalyst particles therein by burning with the second gas stream which is partially reduced thereby, the coke concentration of the further regenerated catalyst particles being less than about 0.1% by weight; recycling the further regenerated catalyst particles to said reaction zone; and directing the resulting carbon oxides-containing partially reduced second gas stream along with at least one air stream to said first regenerative zone as said first gas stream.

14. A process according to claim 7 for converting hydrocarbons in the presence of finely divided catalyst, in which the further regenerated catalyst particles are returned to said regenerative zone along with at least part of the carbon oxides-containing partially reduced gas stream, and such returned further regenerated catalyst particles are recycled along with said partially regenerated catalyst particles to said reaction zone.

15. A process according to claim 7 for converting hydrocarbons in the presence of finely divided catalyst, in which the regenerated and further regenerated catalyst particles are respectively recycled to said reaction zone from said regenerative and auxiliary regenerative zones.

References Cited in the file of this patent

UNITED STATES PATENTS

| | | |
|---|---|---|
| 2,382,472 | Frey | Aug. 14, 1945 |
| 2,434,567 | Jahnig et al. | Jan. 13, 1948 |
| 2,456,707 | Keith | Dec. 21, 1948 |
| 2,606,862 | Keith | Aug. 12, 1952 |
| 2,831,800 | Kelso | Apr. 22, 1958 |